US012434952B2

(12) United States Patent
He et al.

(10) Patent No.: US 12,434,952 B2
(45) Date of Patent: Oct. 7, 2025

(54) ELECTRIC HYDRAULIC FLOOR JACK

(71) Applicant: Zhejiang EP Technology Co., Ltd, Hangzhou (CN)

(72) Inventors: Yufeng He, Hangzhou (CN); Jifeng Xu, Hangzhou (CN); Weixiang He, Hangzhou (CN)

(73) Assignee: ZHEJIANG EP TECHNOLOGY CO., LTD, Hangzhou (CN)

( * ) Notice: Subject to any disclaimer, the term of this patent is extended or adjusted under 35 U.S.C. 154(b) by 338 days.

(21) Appl. No.: 18/221,918

(22) Filed: Jul. 14, 2023

(65) Prior Publication Data

US 2024/0017975 A1 Jan. 18, 2024

(30) Foreign Application Priority Data

Jul. 16, 2022 (CN) ........................ 202210834876.0
Jul. 16, 2022 (CN) ........................ 202221827505.1
Jun. 29, 2023 (CN) ........................ 202321681905.0

(51) Int. Cl.
*B66F 5/04* (2006.01)

(52) U.S. Cl.
CPC .......... *B66F 5/04* (2013.01); *B66F 2700/057* (2013.01)

(58) Field of Classification Search
CPC ........ B66F 5/04; B66F 2700/057; B66F 3/25; B66F 3/42
See application file for complete search history.

(56) References Cited

U.S. PATENT DOCUMENTS 4,289,298 A * 9/1981 Kameda .................... B66F 5/04 254/8 B
4,289,299 A * 9/1981 Kameda .................... B66F 5/04 254/8 B
7,401,764 B1 7/2008 Castillo
9,926,179 B2 * 3/2018 Arzouman .............. B66F 17/00
2020/0011356 A1 * 1/2020 Schulz .................. F15B 20/008
2020/0071140 A1 * 3/2020 Fox ........................... B66F 3/42
2022/0098014 A1 * 3/2022 He ............................ B66F 3/26
2023/0391590 A1 * 12/2023 Hawkins ................... B66F 5/04

FOREIGN PATENT DOCUMENTS

CN 2445994 Y 9/2001
CN 2468847 Y 1/2002

* cited by examiner

*Primary Examiner* — Seahee Hong
(74) *Attorney, Agent, or Firm* — Bayramoglu Law Offices LLC

(57) ABSTRACT

An electric hydraulic floor jack includes a variable plunger structure provided on a motor base and an oil pump base. The variable plunger structure includes a piston hole formed in the oil pump base and communicating with an oil chamber and an oil inlet passage, a plunger sleeve provided at a port of the piston hole, a plunger slidably provided in the plunger sleeve, a U-shaped piston slidably provided in the piston hole, a valve trim slidably provided on the piston, a spring provided in the piston hole and sleeved on the valve trim, and an eccentric wheel provided on an output shaft of a speed reducer. The plunger is driven by the eccentric wheel in cooperation with the spring to continuously make a linear reciprocating motion, thereby continuously opening and closing the check valve, and pumping oil into the cylinder to push the piston rod for lifting work.

20 Claims, 11 Drawing Sheets

ELECTRIC HYDRAULIC FLOOR JACK

CROSS REFERENCE TO THE RELATED APPLICATIONS

This application is based upon and claims priority to Chinese Patent Applications No. 202210834876.0, filed on Jul. 16, 2022; No. 202221827505.1, filed on Jul. 16, 2022; and No. 202321681905.0, filed on Jun. 29, 2023; the entire contents of which are incorporated herein by reference.

TECHNICAL FIELD

The present disclosure relates to the field of jacks, and in particular to an electric hydraulic floor jack.

BACKGROUND

Hydraulically powered jacks have been used for many years to lift, support and lower vehicles for repair or service in a wide variety of situations. The traditional hydraulic jack is always driven manually, pneumatically, and electrically. According to the driving mode, the hydraulic jack is correspondingly provided with a manual pump or a pneumatic pump. The manual pump depends on manpower during use, which requires a large labor intensity and results a slow lifting speed of the jack.

The pneumatic pump employs high-pressure gas to achieve a low labor intensity and a fast lifting speed, but is not used widely for compressed air.

The electric pump is driven by a motor. Typically, the conventional electric pump uses a gear pump structure or a single-diameter plunger structure. The gear pump structure outputs more oil but has low maximum output pressure for hydraulic oil, causing the jack not operable at high pressure. The single-diameter plunger structure has a simple structure and high output pressure, but outputs less oil, such that the jack cannot realize fast lifting at low pressure. In order to achieve a faster lifting speed of the electric pump at low pressure, a plurality of the single-diameter plunger structures are combined, which results in a high cost, a complicated structure, and an undesirable reliability.

To accelerate the lifting speed of the conventional hydraulic jack with no load, the manual pump is provided with two or more manual pump bodies and pump core structures as alternatives for use. In case of no load or low pressure, the pump body and pump core structure with a large displacement is used. In case of high pressure, the pump body and pump core structure with a small displacement is used. Consequently, the jack achieves a fast lifting speed with no load and a slow lifting speed in a heavy load to ensure the stability. However, each jack is provided with two or more pump bodies and pump core structures, which cause troublesome operations. This also leads to a high cost and a large size, and cannot lower the labor intensity. Therefore, an electric hydraulic floor jack is provided.

SUMMARY

An objective of the present disclosure is to provide an electric hydraulic floor jack, to solve the above problems.

To achieve the above-mentioned objective, the present disclosure provides the following technical solutions: An electric hydraulic floor jack includes a frame, an oil pump assembly provided on the frame, a wallboard assembly, a lifting arm assembly provided on the frame and connected to the oil pump assembly, and a vehicle wheel provided on the frame, where the oil pump assembly includes an oil pump base, a housing provided on the oil pump base, a cylinder, a piston rod slidably provided in the cylinder and including one end connected to the lifting arm assembly, a motor base provided on the oil pump base, a speed reducer provided on the motor base, a motor connected to the speed reducer, and a power supply configured to provide a power for the motor; an oil chamber is formed between the housing and the cylinder; an oil inlet passage and an oil return passage that communicate with the cylinder are provided on the oil pump base; an oil drain valve is provided on the oil return passage; a handle is further provided on the frame; a switch for starting and stopping the motor and an oil drain valve handle are provided on the handle; an oil drain valve pulling wire is connected between the oil drain valve handle and the oil drain valve; the electric hydraulic floor jack further includes a variable plunger structure provided on the motor base and the oil pump base; and the variable plunger structure includes a piston hole formed in the oil pump base and communicating with the oil chamber and the oil inlet passage, a plunger sleeve provided at a port of the piston hole, a plunger slidably provided in the plunger sleeve, a U-shaped piston slidably provided in the piston hole, a valve trim slidably provided on the piston, a spring provided in the piston hole and sleeved on the valve trim, and an eccentric wheel provided on an output shaft of the speed reducer.

Further preferably, a sealing platform is provided on the valve trim; a bump is provided on the sealing platform; a through hole matched with the bump is formed in the piston; and a plurality of oil flow holes are further formed in the piston.

Further preferably, a length of the bump is greater than a depth of the through hole, and a check valve is further provided on the oil inlet passage.

Further preferably, sealing rings are respectively provided between the plunger sleeve and the oil pump base and between the plunger and the plunger sleeve.

Further preferably, the piston rod includes an ejector rod and a piston head connected to the ejector rod; and a sealing member for sealing between the piston head and the cylinder is provided on the piston head.

Further preferably, a filter screen is provided between the spring and a bottom of the piston hole.

Further preferably, the power supply refers to a storage battery or a plug connected to a power socket, and is connected to the motor through a circuit.

Further preferably, the plug is further connected to the power socket or a portable power bank in a pluggable manner.

Further preferably, the oil drain valve includes a guide sleeve provided at the oil return passage on the oil pump base, an oil drain valve trim slidably provided on the guide sleeve and connected to the oil drain valve pulling wire, a pulling wire base provided on the oil pump base, and an oil drain spring provided in the oil return passage and located between the oil drain valve trim and the guide sleeve.

Further preferably, an oil suction passage communicating with the oil chamber and the piston hole is formed in the oil pump base, and a first check valve is provided in the oil suction passage.

Further preferably, a piston hole region between the piston and the plunger refers to a pressure oil chamber, and a piston hole region at the other side of the piston refers to an oil suction chamber.

Further preferably, the electric hydraulic floor jack further includes a radial variable plunger pump; the radial variable plunger pump includes the motor, the speed reducer connected to the motor, the motor base provided on the speed reducer, a housing provided on the motor base, and a radial variable mechanism provided in the housing; the radial variable mechanism further includes a plunger chamber formed in the housing, a pump body provided in the plunger chamber, a high-pressure plunger slidably provided in the pump body, a low-pressure plunger slidably provided in the plunger chamber, the valve trim slidably provided on the low-pressure plunger, and the spring provided between a bottom of the plunger chamber and the valve trim; an oil inlet and an oil outlet that communicate with the plunger chamber and are located at two sides of the low-pressure plunger are formed in the housing; and each of the oil inlet and the oil outlet is provided with a check valve.

Further preferably, the housing refers to the oil pump base.

Further preferably, the low-pressure plunger is provided with a through hole; and a drive rod penetrating through the low-pressure plunger is provided on the valve trim.

Further preferably, a length of the drive rod is greater than a depth of the through hole, and a diameter of the drive rod is less than a diameter of the through hole.

Further preferably, an oil groove communicating with the through hole is further formed in the low-pressure plunger.

Further preferably, a gap for allowing oil or other liquids to flow through conveniently is formed between the drive rod and the through hole, and the gap communicates with the oil groove.

Further preferably, sealing rings are respectively provided between the pump body and the housing, between the low-pressure plunger and the housing, and between the high-pressure plunger and the pump body.

Further preferably, a plunger chamber region between the low-pressure plunger and the pump body refers to a pressure oil chamber, and a plunger chamber region at the other side of the low-pressure plunger refers to an oil suction chamber.

The present disclosure is driven electrically. When the present disclosure is used, the motor is powered by the storage battery or the battery pack, or the motor is powered by directly connecting the plug to the power socket or the portable power bank. The power supply can be changed according to an application environment. Without the power socket or the portable power bank, the motor can be powered by the storage battery or the battery pack for normal work.

With the variable plunger structure, the motor drives the speed reducer. The speed reducer drives the eccentric wheel. The eccentric wheel continuously pushes the plunger. In cooperation with a restoring force of the spring, the plunger is driven to continuously make a linear reciprocating motion, thereby continuously opening and closing the check valve, and pumping oil into the cylinder to push the piston rod for lifting work. In case of a light load, the oil is pumped into the cylinder through a pushing force of the spring for the valve trim and the piston. The piston serves as a drive member to extrude the oil. In response to a larger diameter of the piston, more oil is pumped to realize a fast lifting speed of the jack in no load. In case of a heavy load, when the restoring force of the spring cannot drive the piston to extrude the oil to open the check valve, the eccentric wheel pushes the plunger, and the plunger extrudes the oil to open the check valve on the oil inlet passage for high-pressure oil supply, thereby realizing normal lifting at a high pressure. In response to a smaller diameter of the plunger, less oil is pumped each time to lift the heavy load slowly and stably. The present disclosure is automatically switched in the no load and the heavy load. The variable plunger structure has a simple overall structure, a small size and a low cost. With the electric mode, the labor intensity is reduced.

Further, a filter screen is provided between the spring and a bottom of the piston hole. Through the filter screen, oil entering the piston hole and the cylinder from the oil chamber is filtered.

Figure 1:
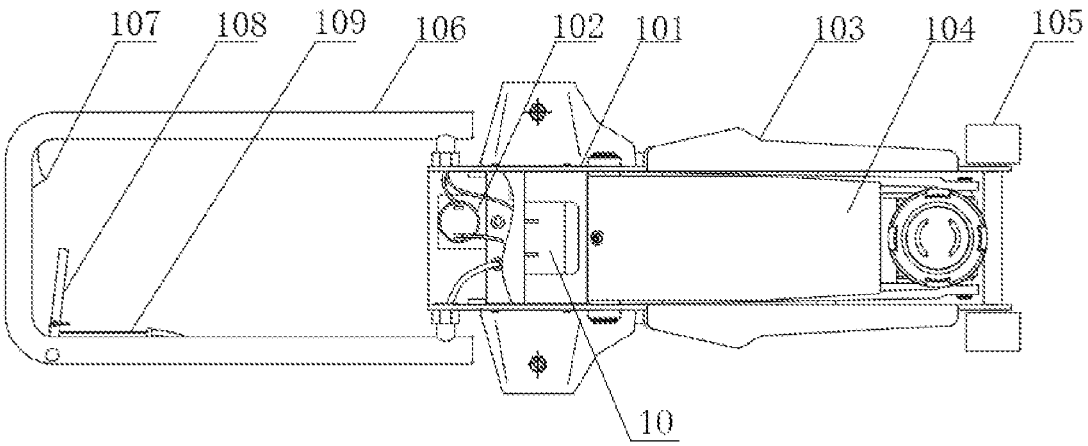
FIG. 1 is a structural schematic view according to the present disclosure.
Figure 2:
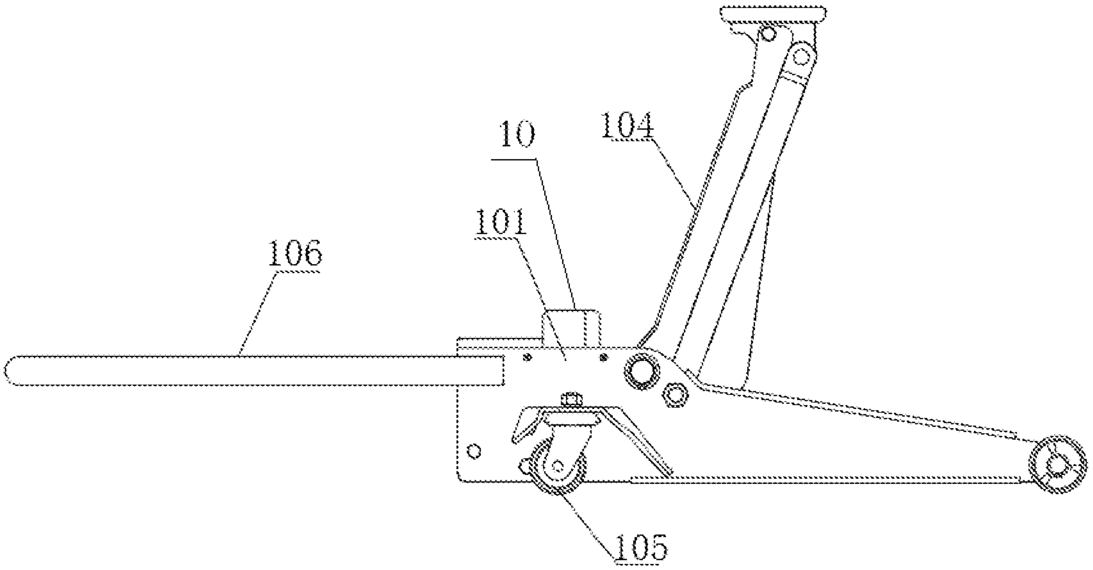
FIG. 2 is a structural schematic view from another viewing angle according to the present disclosure.
Figure 3:
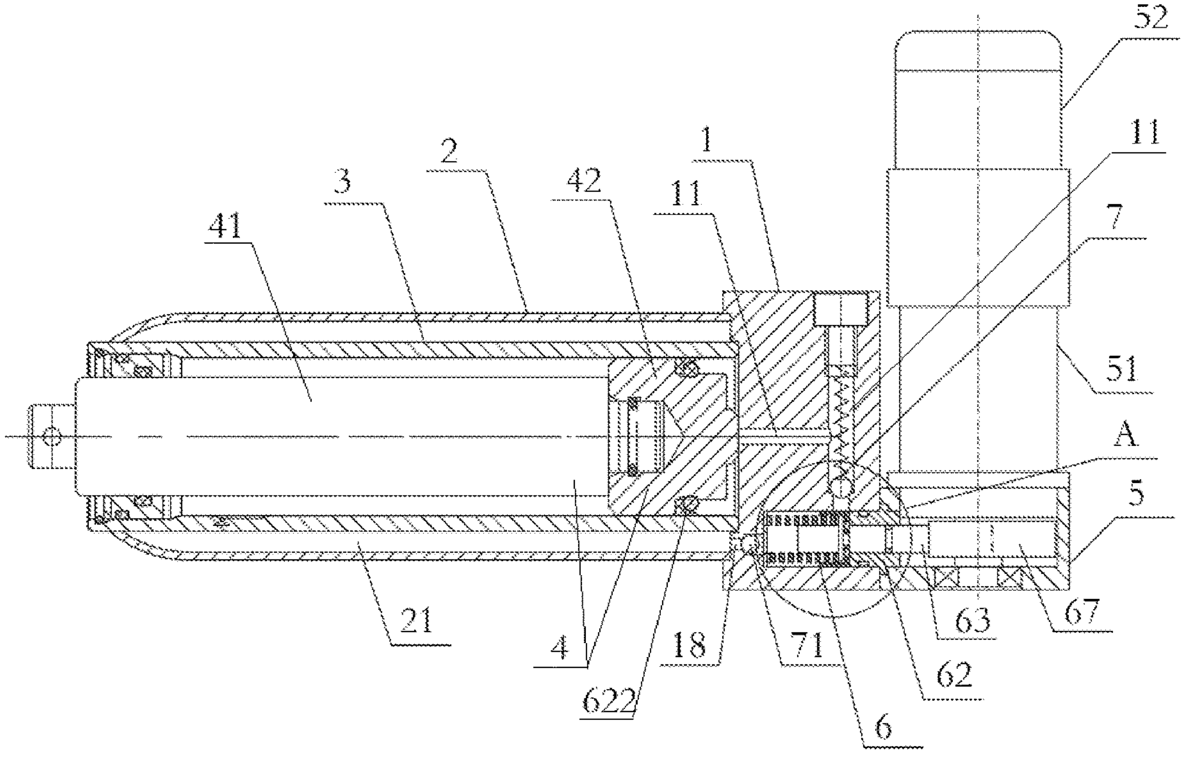
FIG. 3 is a partial structural schematic view of an oil pump assembly according to Embodiment 1 of the present disclosure.
Figure 4:
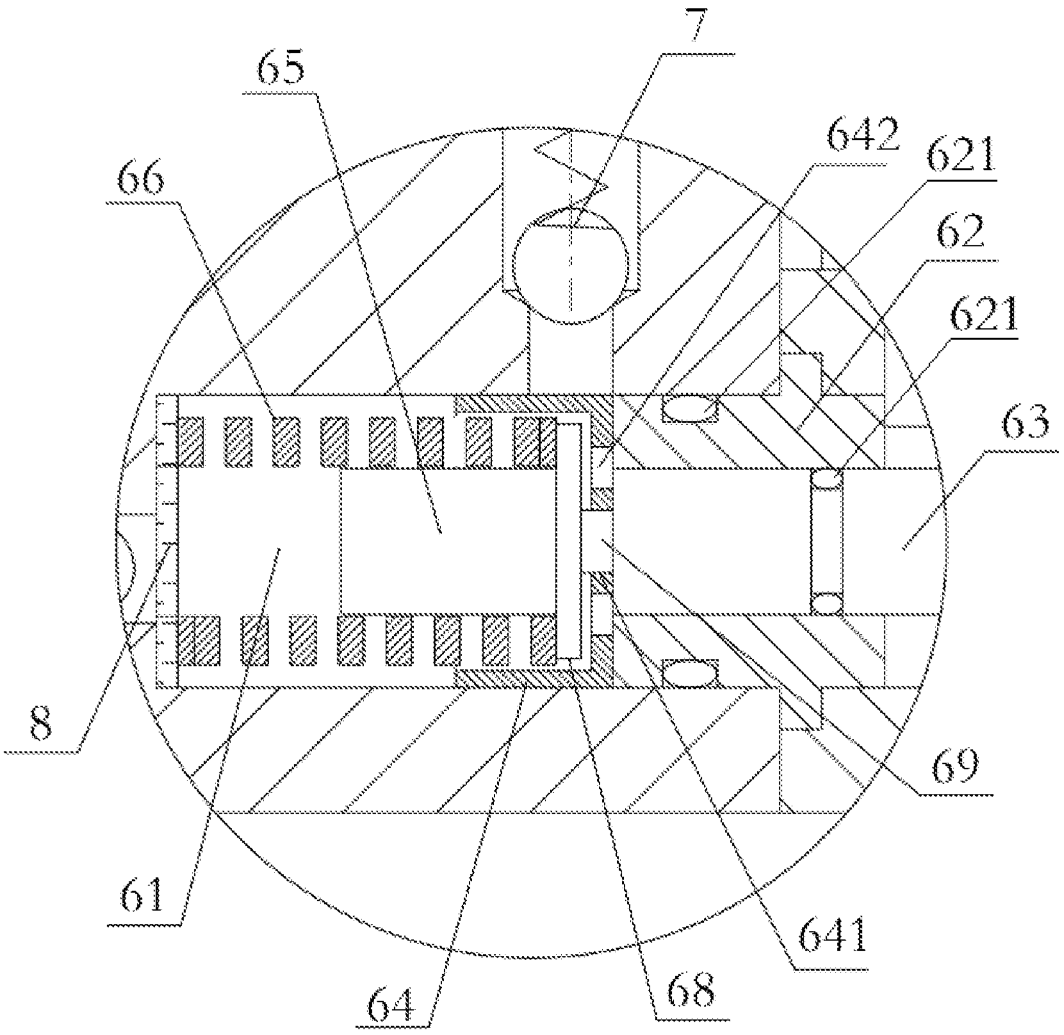
FIG. 4 is a partially enlarged structural schematic view of A shown in FIG. 3 of the present disclosure.
Figure 5:
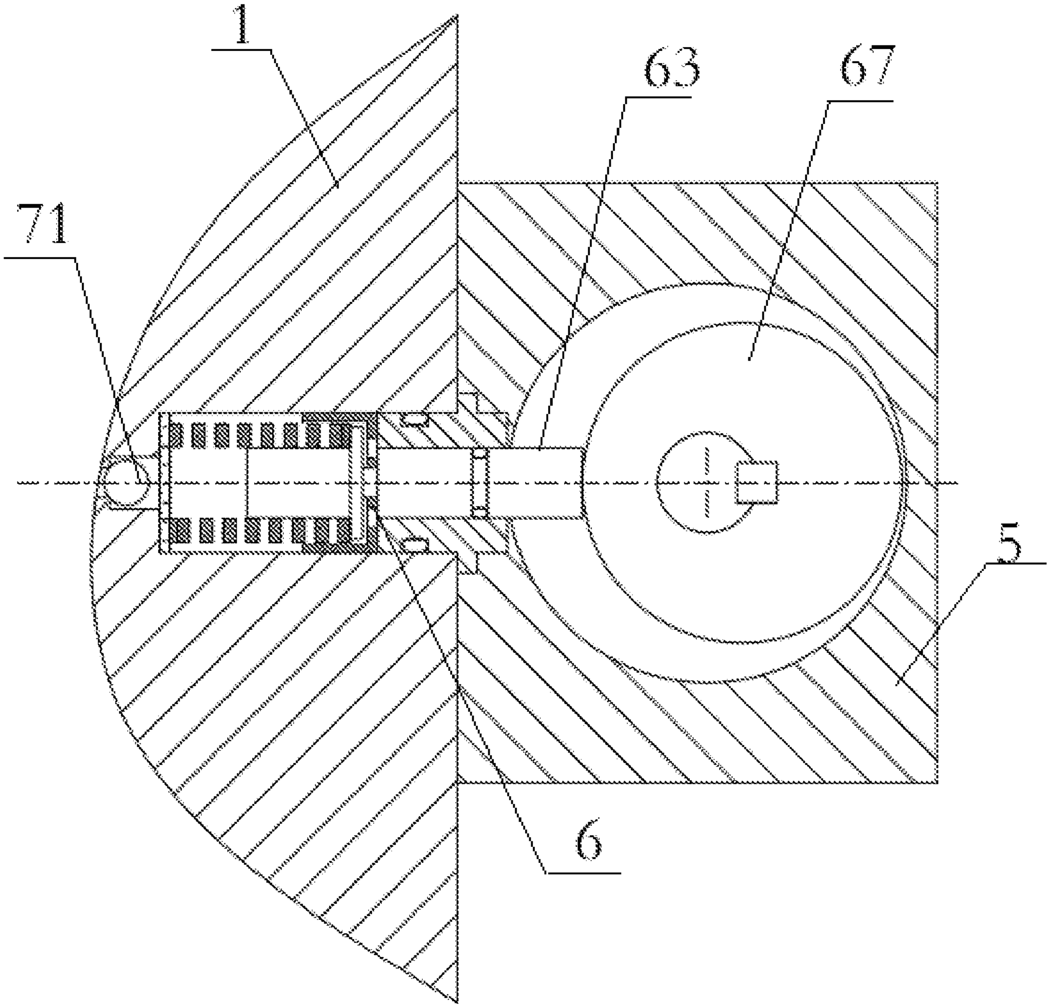
FIG. 5 is a partial sectional schematic view of an oil pump assembly from another viewing angle according to Embodiment 1 of the present disclosure.
Figure 6:
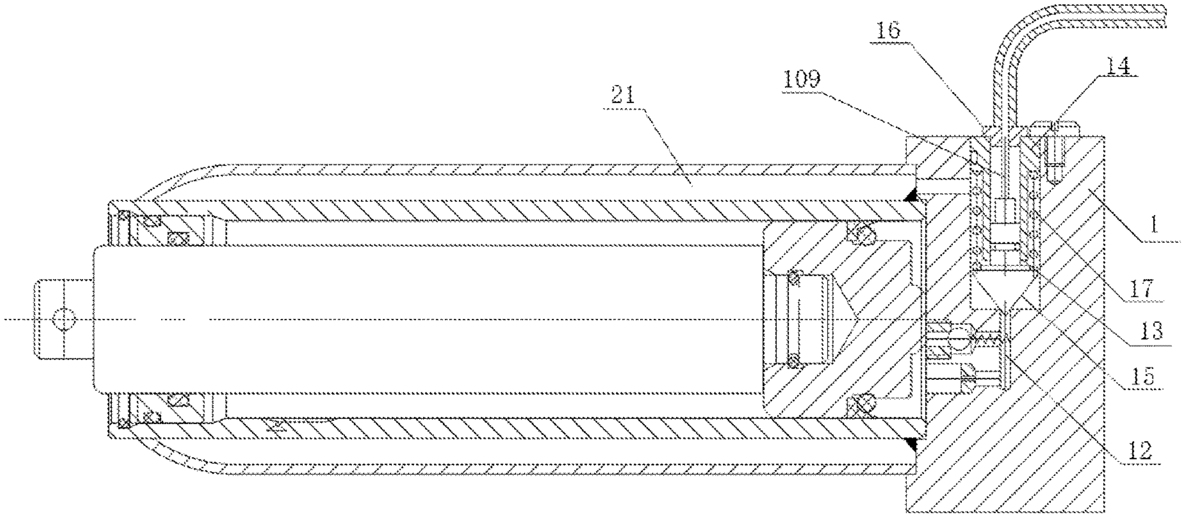
FIG. 6 is a sectional schematic view of an oil pump assembly from another viewing angle according to the present disclosure.
Figure 7:
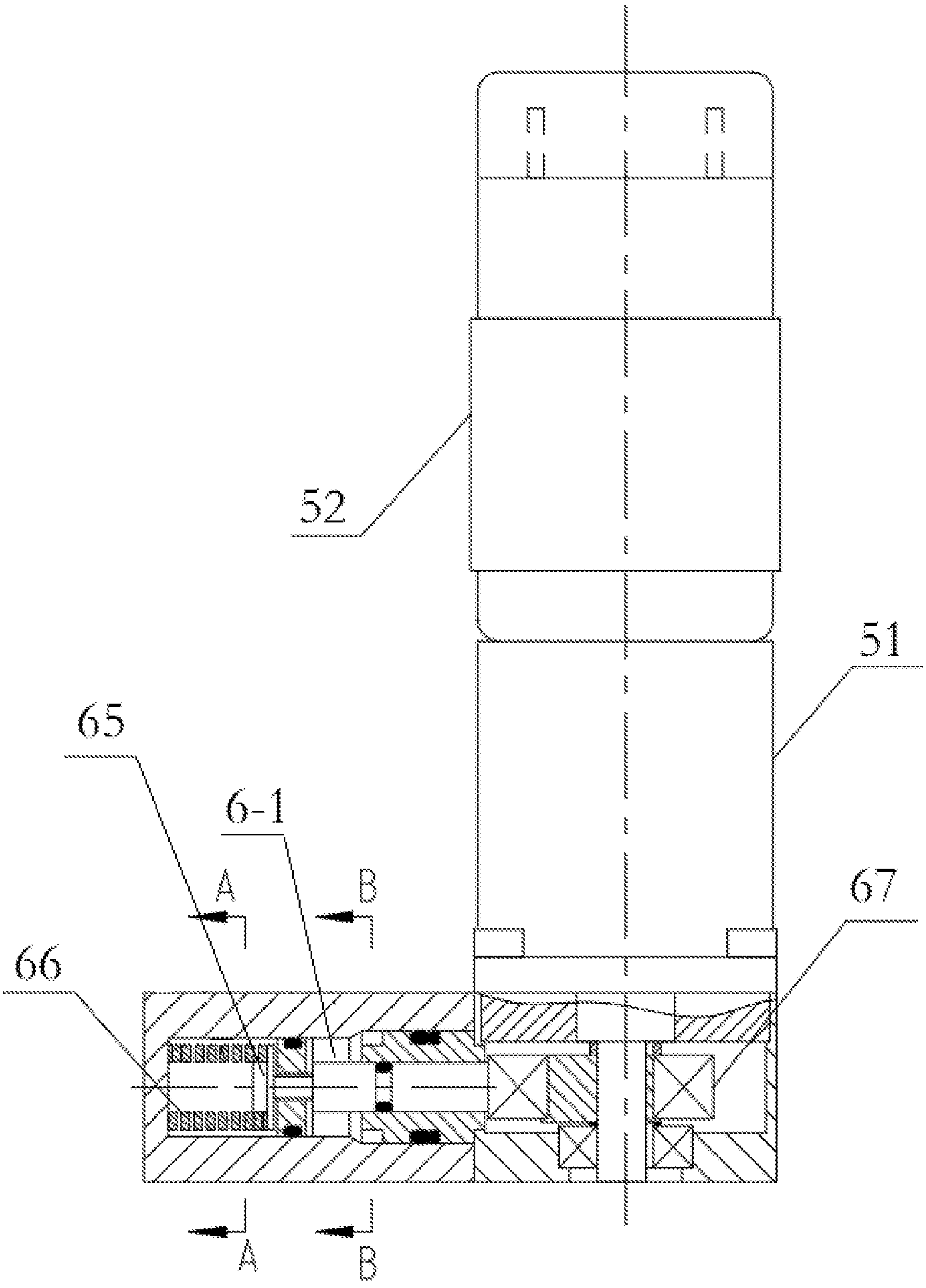
FIG. 7 is a structural schematic view according to Embodiment 2 of the present disclosure.
Figure 8:
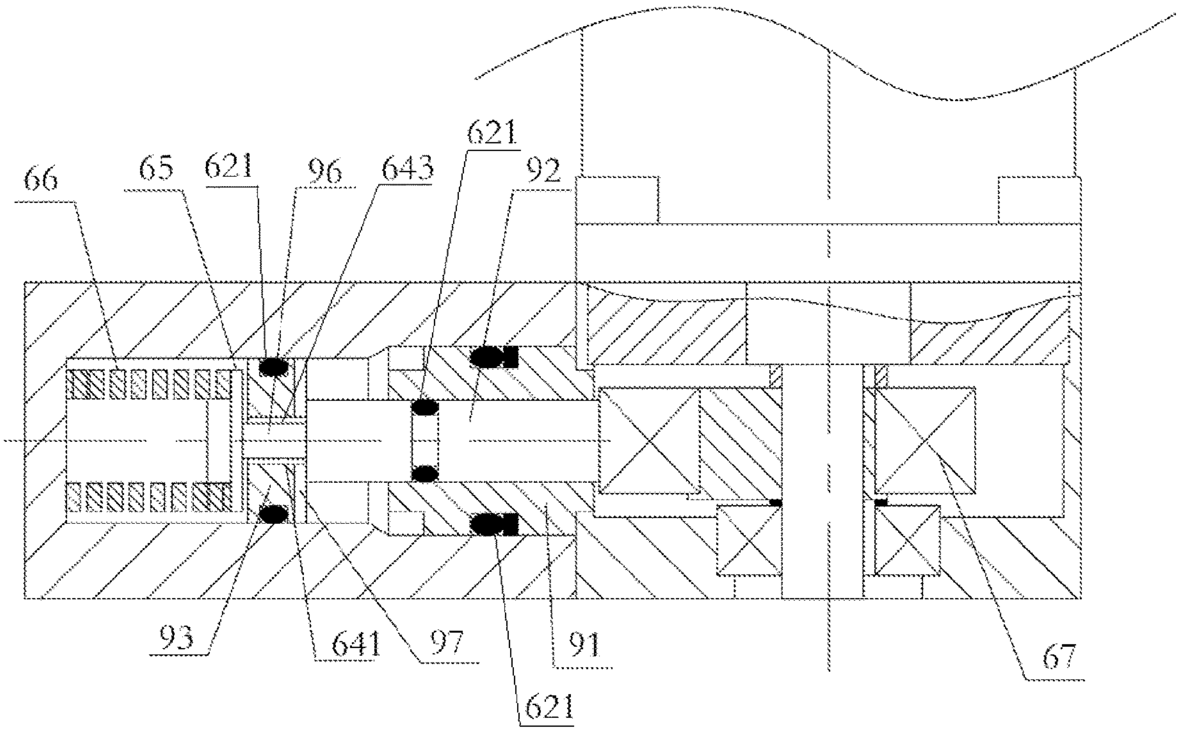
FIG. 8 is a partial structural schematic view according to Embodiment 2 of the present disclosure.
Figure 9:
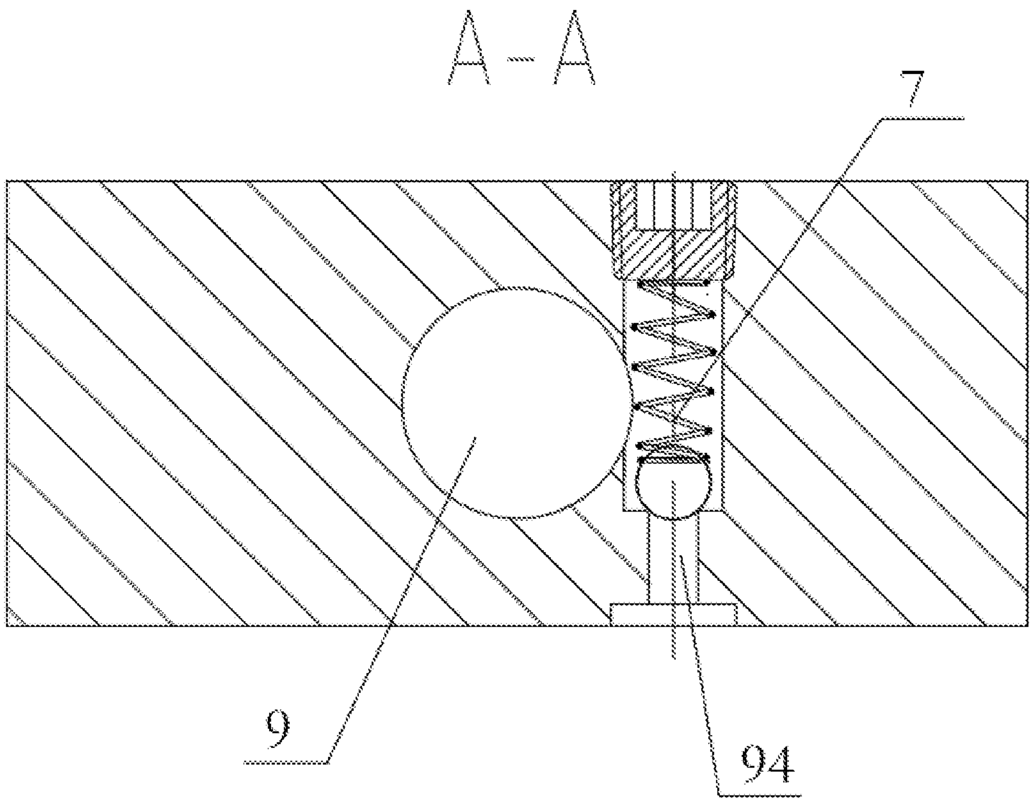
FIG. 9 is a sectional schematic view of A-A shown in FIG. 7 of the present disclosure.
Figure 10:
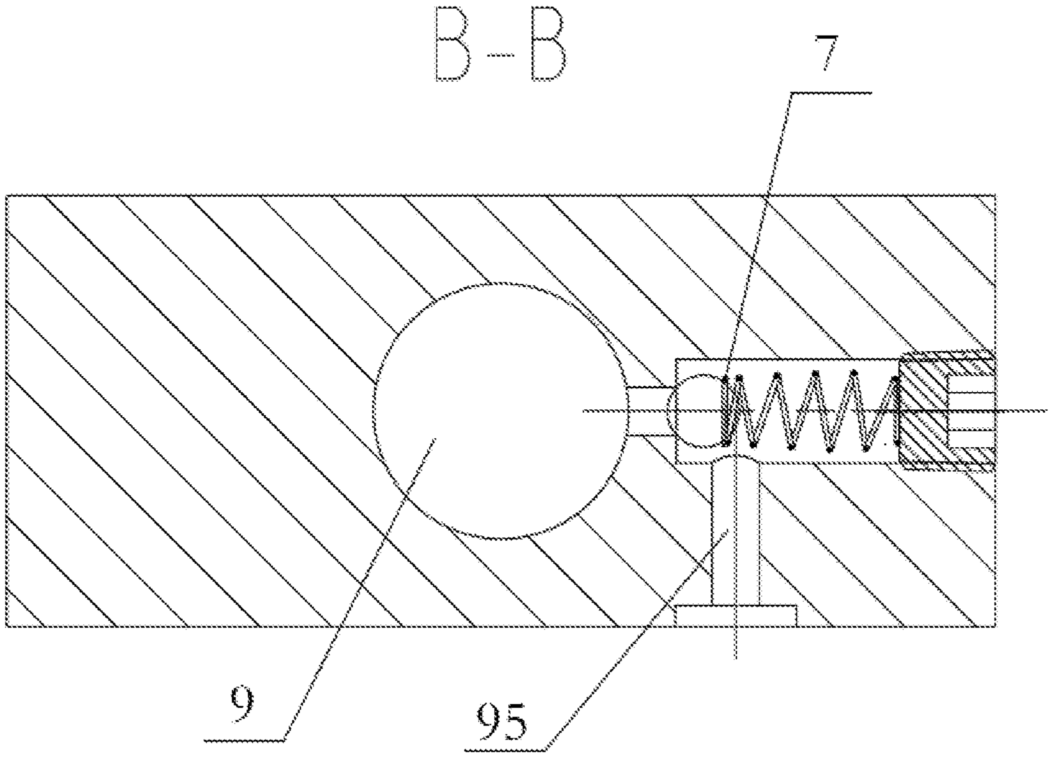
FIG. 10 is a sectional schematic view of B-B shown in FIG. 7 of the present disclosure.

In the figures: 101: frame, 102: oil pump assembly, 103: wallboard assembly, 104: lifting arm assembly, 105: vehicle wheel, 106: handle, 107: switch, 108: oil drain valve handle, 109: oil drain valve pulling wire, 1: oil pump base, 11: oil inlet passage, 12: oil return passage, 13: oil drain valve, 14: guide sleeve, 15: oil drain valve trim, 16: pulling wire base, 17: oil drain spring, 18: oil suction passage, 2: housing, 21: oil chamber, 3: cylinder, 4: piston rod, 41: ejector rod, 42: piston head, 5: motor base, 51: speed reducer, 52: motor, 6: variable plunger structure, 6-1: radial variable mechanism, 61: piston hole, 62: plunger sleeve, 621: sealing ring, 622: sealing member, 63: plunger, 64: piston, 641: through hole, 642: oil flow hole, 643: gap, 65: valve trim, 66: spring, 67: eccentric wheel, 68: sealing platform, 69: bump, 7: check valve, 71: first check valve, 8: filter screen, 9: plunger chamber, 91: pump body, 92: high-pressure plunger, 93: low-pressure plunger, 94: oil inlet, 95: oil outlet, 96: drive rod, 97: oil groove, and 10: battery pack.

DETAILED DESCRIPTION OF THE EMBODIMENTS

The electric hydraulic floor jack of the present disclosure is described in further detail below with reference to the drawings.

Embodiment 1

Referring to FIGS. 1-6, an electric hydraulic floor jack includes frame 101, oil pump assembly 102 provided on the frame 101, wallboard assembly 103, lifting arm assembly 104 provided on the frame 101 and connected to the oil pump assembly 102, and vehicle wheel 105 provided on the frame 101. The oil pump assembly 102 includes oil pump base 1, housing 2 provided on the oil pump base 1, cylinder 3, piston rod 4 slidably provided in the cylinder 3 and including one end connected to the lifting arm assembly, motor base 5 provided on the oil pump base 1, speed reducer 51 provided on the motor base 5, motor 52 connected to the speed reducer 51, and a power supply configured to provide a power for the motor 52. Oil chamber 21 is formed between the housing 2 and the cylinder 3. Oil inlet passage 11 and oil return passage 12 that communicate with the cylinder 3 are provided on the oil pump base 1. Oil drain valve 13 is provided on the oil return passage 12. Handle 106 is further provided on the frame 101. Switch 107 for starting and stopping the motor 52 and oil drain valve handle 108 are provided on the handle 106. Oil drain valve pulling wire 109 is connected between the oil drain valve handle 108 and the oil drain valve 13. The electric hydraulic floor jack further includes variable plunger structure 6 provided on the motor base 5 and the oil pump base 1. The variable plunger structure 6 includes piston hole 61 formed in the oil pump base 1 and communicating with the oil chamber 21 and the oil inlet passage 11, plunger sleeve 62 provided at a port of the piston hole 61, plunger 63 slidably provided in the plunger sleeve 62, U-shaped piston 64 slidably provided in the piston hole 61, valve trim 65 slidably provided on the piston 64, spring 66 provided in the piston hole 61 and sleeved on the valve trim 65, and eccentric wheel 67 provided on an output shaft of the speed reducer 51.

With the variable plunger structure 6, the motor 52 drives the speed reducer 51. The speed reducer 51 drives the eccentric wheel 67. The eccentric wheel 67 continuously pushed the plunger 63. In cooperation with a restoring force of the spring, the plunger 63 is pushed for restoration, and the plunger 63 is driven to continuously make a linear reciprocating motion, thereby continuously opening and closing an oil passage. After the check valve 7 is impacted continuously, the check valve 7 is opened to pump oil into the cylinder 3, thereby pushing the piston rod 4 for lifting work. In case of a light load, the oil is pumped into the cylinder 3 through a pushing force of the spring 66 for the valve trim 65 and the piston 64. The piston 64 serves as a drive member to extrude the oil. In response to a larger diameter of the piston 64, more oil is pumped to realize a fast lifting speed of the jack in no load. In case of a heavy load, when the restoring force of the spring 66 cannot drive the piston 64 to extrude the oil to open the check valve 7, the eccentric wheel 67 pushes the plunger 63, and the plunger 63 extrudes the oil to open the check valve 7 on the oil inlet passage for high-pressure oil supply, thereby realizing normal lifting at a high pressure. In response to a smaller diameter of the plunger 63, less oil is pumped each time to lift the heavy load slowly and stably. The present disclosure is automatically switched in the no load and the heavy load. The whole variable plunger structure 6 has a simple structure, a small size and a low cost. With the electric mode, the labor intensity is reduced.

Further, sealing platform 68 is provided on the valve trim 65. Bump 69 is provided on the sealing platform 68. Through hole 641 matched with the bump 69 is formed in the piston 64. A plurality of oil flow holes 642 are further formed in the piston 64. A length of the bump 69 is greater than a depth of the through hole 641. With the sealing platform 68, when the sealing platform 68 is attached to a bottom of the piston 64, the sealing platform 68 cuts off the oil passage between the piston hole 61 and the oil flow hole 642. When the sealing platform 68 is separated from the bottom of the piston 64, the oil passage between the piston hole 61 and the oil flow hole 642 is opened. The pump 69 is provided, and the length of the bump 69 is greater than the depth of the through hole. By moving the plunger 63, the bump 69 is pushed, such that the sealing platform 68 is separated from the bottom of the piston 64. When the plunger 63 does not push the bump 69, the valve trim 65 is pushed by the restoring force of the spring 66. The valve trim 65 drives the bump 69. The bump 69 pushes the plunger 63 for restoration. The sealing platform 68 is attached to the bottom of the piston 64.

Further, check valve 7 is further provided on the oil inlet passage 11.

Further, sealing rings 621 are respectively provided between the plunger sleeve 62 and the oil pump base 1 and between the plunger 63 and the plunger sleeve 62.

Further, the piston rod 4 includes ejector rod 41 and piston head 42 connected to the ejector rod 41. Sealing member 622 for sealing between the piston head 4 and the cylinder 3 is provided on the piston head 42.

Further, filter screen 8 is provided between the spring 66 and a bottom of the piston hole 61. Through the filter screen 8, oil entering the piston hole 61 and the cylinder 3 from the oil chamber 21 is filtered.

Further, the power supply refers to a storage battery, battery pack 10 or a plug connected to a power socket, and is connected to the motor 52 through a circuit. When the electric hydraulic floor jack is used, the motor 52 can be powered by the storage battery or the battery pack 10, or the motor 52 is powered by directly connecting the plug to the power socket or a portable power bank in a pluggable manner.

Further, handle 106 is further provided on the frame 101. Switch 107 for starting and stopping the motor 52 and oil drain valve handle 108 for opening and closing the oil drain valve 13 are provided on the handle 106. Oil drain valve pulling wire 109 is connected between the oil drain valve handle 108 and the oil drain valve 13. The drain valve handle 108 includes guide sleeve 14 provided at the oil return passage 12 on the oil pump base 1 through a bolt, oil drain valve trim 15 slidably provided on the guide sleeve 14 and connected to the oil drain valve pulling wire 109, pulling wire base 16 provided on the guide sleeve 14, and oil drain spring 17 provided in the oil return passage 12 and located between the oil drain valve trim 15 and the guide sleeve 14.

Further, oil suction passage 18 communicating with the oil chamber 21 and the piston hole 61 is formed in the oil pump base 1, and first check valve 71 is provided in the oil suction passage 18.

In use: The jack is pushed by the handle 106 to move to a desired position. The motor 52 is powered on. The motor provided with the storage battery or the battery pack is powered by the storage battery or the battery pack. The motor provided with the plug is powered by connecting the plug to the power socket or the portable power bank. The switch 107 is then pulled to start the motor 52. The motor 52 drives the speed reducer 51 to start. The speed reducer 51 drives the output shaft to rotate. The output shaft drives the eccentric wheel 67 to rotate. The eccentric wheel 67 in rotation comes in contact with the plunger 63 to push the plunger 63 forward.

In a light load or no load: The plunger 63 pushes the bump 69. The bump 69 drives the valve trim 65 to move forward to open the oil passage between the piston hole 61 and the oil flow hole 642. While moving continuously forward, the plunger 63 comes in contact with the piston 64 to push the piston 64, and extrudes the oil in the pressure oil chamber. Once extruded, the oil pushes the check valve 7 on the oil inlet passage to open the check valve 7. In this case, oil in one stroke of the plunger 63 enters the cylinder 3.

Following rotation of the eccentric wheel 67, when the eccentric wheel 67 does not push the plunger 63, the valve trim 65, the piston 64 and the plunger 63 are driven by the restoring force of the spring 66 for restoration. In restoration, the valve trim 65 is attached to the piston 64 under the pushing of the spring. While the oil flow hole 642 is closed, the piston 64 extrudes the oil in the pressure oil chamber to open the check valve 7 on the oil inlet passage. In this case, oil in one stroke of a difference between the diameter of the piston 64 and the diameter of the plunger 63 enters the cylinder 3. The diameter of the piston 64 is greater than the diameter of the plunger 63.

After pumped into the cylinder 3, the oil pushes the piston rod 4. The piston rod 4 pushes the lifting arm assembly, thereby driving the lifting arm assembly for lifting.

When the oil suction chamber has a lower pressure than the oil chamber 21, the first check valve 71 in the oil suction passage 18 is opened under the pushing of the oil pressure of the oil chamber 21, to push the oil in the oil chamber 21 to the oil suction chamber.

While the eccentric wheel 67 rotates, the plunger 63 and the piston 64 are driven by the restoring force of the spring 66 to move back and forth, such that the check valve is continuously opened and closed for cyclic oil supply. To sum up, in the no load, the piston 64 serves as a drive member to push the oil. The piston 64 has a large area and moves to cause a large compression volume to the oil. Therefore, more oil is pumped into the cylinder 3, and the piston rod 4 has a fast lifting speed.

In a heavy load: Since a weight of a load causes a pressure in the oil cylinder, the piston 64 cannot be pushed by the restoring force of the spring 66 to open the check valve 7. Under the restoring force of the spring, the piston 64 can only be pushed to move a short distance, thereby forcing the plunger 63 for restoration. When the oil suction chamber has the lower pressure than the oil chamber 21, the first check valve 71 in the oil suction passage 18 is opened by the oil pressure in the oil chamber 21, to push the oil in the oil chamber 21 to the oil suction chamber. When the eccentric wheel 67 rotates to push the plunger 63 again, the plunger 63 moves to extrude the oil in the pressure oil chamber. The eccentric wheel 67 squeezes the plunger 63, such that the plunger 63 extrudes the oil in the pressure oil chamber to open the check valve 7, thereby realizing oil supply in the heavy load. In the heavy load, the plunger 63 serves as a drive member to extrude the oil. The plunger 63 has a small area, and causes a small compression volume to the oil. Therefore, less oil is pumped into the cylinder 3 to lift the load or the heavy load slowly and stably.

After the load is lifted in place, the switch 107 is pulled again, and the motor 52 is closed to stop lifting the lifting arm assembly 104. After use, the oil drain valve handle 108 on the handle 106 is pulled. The oil drain valve handle 108 pulls the oil drain valve trim 15 through the oil drain valve pulling wire 109 to open the oil passage of the oil return passage 12. The lifting arm assembly 104 and the piston rod 4 are restored.

Embodiment 2

Referring to FIGS. 7-10, a radial variable plunger pump is used in the embodiment. The embodiment structurally differs from Embodiment 1 in: The radial variable mechanism 6-1 further includes plunger chamber 9 formed in the housing, pump body 91 provided in the plunger chamber 9, high-pressure plunger 92 slidably provided in the pump body 91, low-pressure plunger 93 slidably provided in the plunger chamber 9, the valve trim 65 slidably provided on the low-pressure plunger 93, and the spring 66 provided between a bottom of the plunger chamber 9 and the valve trim 65. Oil inlet 94 and oil outlet 95 that communicate with the plunger chamber 9 and are located at two sides of the low-pressure plunger 93 are formed in the housing. Each of the oil inlet 94 and the oil outlet 95 is provided with check valve 7. The housing in the embodiment refers to the oil pump base in Embodiment 1.

Further, the low-pressure plunger 93 is provided with through hole 641. Drive rod 96 penetrating through the low-pressure plunger 93 is provided on the valve trim 65.

Further, a length of the drive rod 96 is greater than a depth of the through hole 641, and a diameter of the drive rod 96 is less than a diameter of the through hole 641.

Further, oil groove 97 communicating with the through hole 641 is further formed in the low-pressure plunger 93.

Further, gap 643 for allowing oil or other liquids to flow through conveniently is formed between the drive rod 96 and the through hole 641, and the gap 643 communicates with the oil groove 97.

Further, sealing rings 621 are respectively provided between the pump body 91 and the housing, between the low-pressure plunger 93 and the housing, and between the high-pressure plunger 92 and the pump body 91.

Further, a plunger chamber region between the low-pressure plunger 93 and the pump body 91 refers to a pressure oil chamber, and a plunger chamber region at the other side of the low-pressure plunger 93 refers to an oil suction chamber.

There are also the motor 52, the speed reducer 51 connected to the motor 52, and the motor base 5 provided on the speed reducer 51. The motor 52 drives the eccentric wheel 67 to rotate, thereby pushing the high-pressure plunger 92.

In the embodiment, in use: The oil inlet is connected to an oil tank. The oil tank supplies the oil. The oil outlet is connected to a hydraulic device to be used. The motor 52 is started. The motor 52 drives the speed reducer 51. The speed reducer 51 drives the eccentric wheel 67 to rotate. The eccentric wheel 67 in rotation comes in contact with the high-pressure plunger to push the high-pressure plunger 92 forward.

In a light load or no load: The high-pressure plunger 92 pushes the drive rod 96. The drive rod 96 drives the valve trim 65 to move forward. The valve trim 65 is not attached to the low-pressure plunger 93, such that the oil passage between the plunger chamber 9 and the through hole 641 is opened. While moving forward continuously, the high-pressure plunger 92 comes in contact with the low-pressure plunger 93 to push the low-pressure plunger 93, and extrude the oil in the pressure oil chamber. Once extruded, the oil pushes the check valve 7 on the oil outlet passage 95 to open the check valve 7. In this case, oil for one stroke of the high-pressure plunger 92 is pumped into the hydraulic device. Following rotation of the eccentric wheel 67, when the eccentric wheel 67 does not push the high-pressure plunger 92, the valve trim 65, the low-pressure plunger 93 and the high-pressure plunger 92 are driven by the restoring force of the spring 66 for restoration. In restoration, the valve trim 65 is attached to the low-pressure plunger 93 under the pushing of the spring. While the gap 643 is closed, the low-pressure plunger 93 extrudes the oil in the pressure oil chamber to open the check valve 7 on the oil outlet passage 95. In this case, oil in one stroke of a difference between a diameter of the low-pressure plunger 93 and a diameter of the high-pressure plunger 92 is pumped into the hydraulic device. The diameter of the low-pressure plunger 93 is greater than the diameter of the high-pressure plunger 92. The oil pumped into the hydraulic device drives the hydraulic device to work. Meanwhile, the oil tank has a greater pressure than the oil suction chamber, the check valve 7 at the oil inlet 94 is opened, and the oil in the oil tank is pushed to the oil suction chamber. While the eccentric wheel 67 rotates, the high-pressure plunger 92 and the low-pressure plunger 93 are driven by the restoring force of the spring 66 to move back and forth, such that the check valve is continuously opened and closed for cyclic oil supply. To sum up, in the no load or light load of the hydraulic device, the low-pressure plunger 93 pumps the hydraulic oil into the hydraulic device through the oil outlet 95. The low-pressure plunger 93 has a large area and extrudes a large compression volume of the oil. Therefore, more oil is pumped into the hydraulic device to achieve a fast lifting speed in the light load or no load.

In a heavy load: When the restoring force of the spring 66 for driving the low-pressure plunger 93 cannot open the check valve 7 at the oil outlet 95, the low-pressure plunger 93 can only be pushed to move a short distance under the restoring force of the spring, thereby forcing the high-pressure plunger 92 for restoration. The oil tank has a higher pressure than the oil suction chamber, and the check valve 7 at the oil inlet 94 is opened to push the oil in the oil tank to the oil suction chamber. When the eccentric wheel 67 pushes the high-pressure plunger 92 to move forward again, the check valve 7 at the oil outlet 95 is opened under an extrusion force of the high-pressure plunger 92 to pump the hydraulic oil into the hydraulic device to realize high-pressure oil supply. In the heavy load, the high-pressure plunger 92 serves as a drive member to extrude the oil. The high-pressure plunger 92 has a small area, and causes a small compression volume to the oil. Therefore, less oil is pumped into the hydraulic device to lift the heavy load slowly and stably.

Embodiment 3

Figure 11:
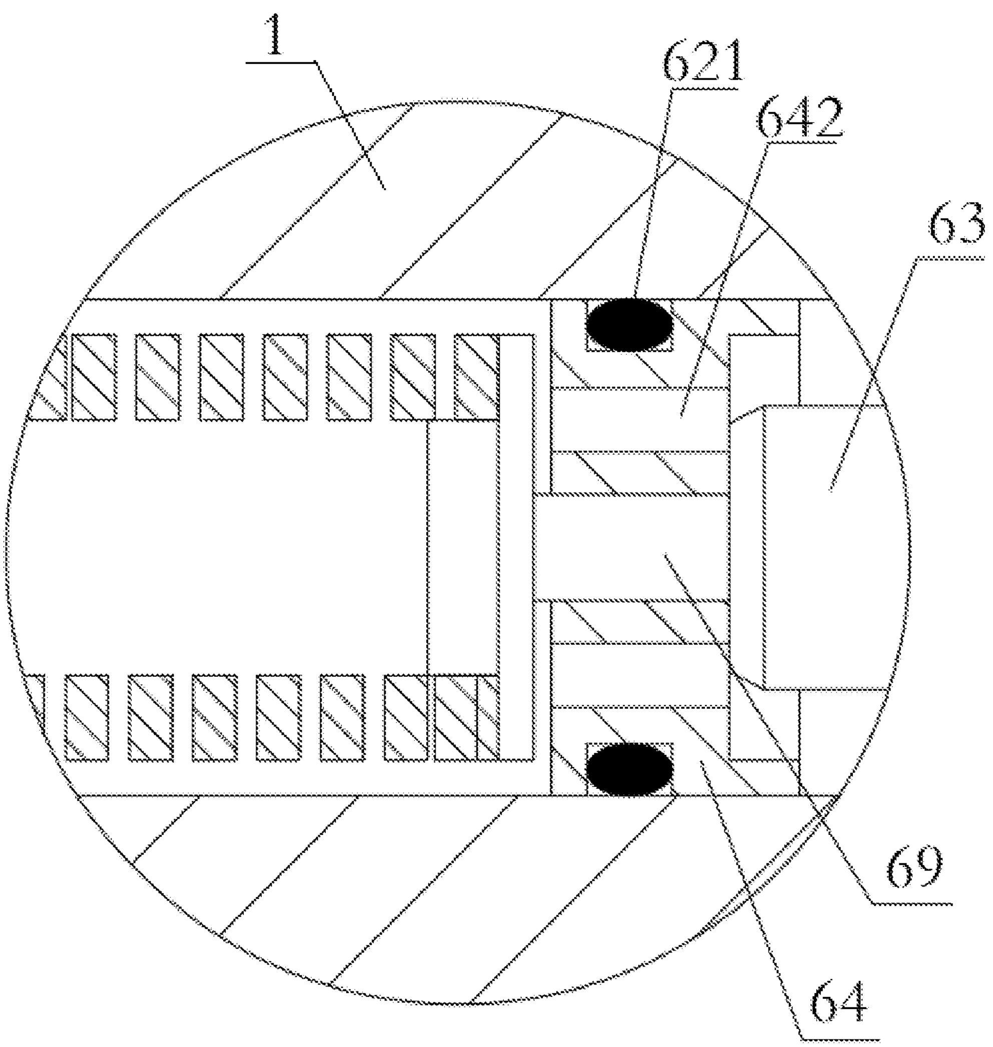
FIG. 11 is a structural schematic view according to Embodiment 3 of the present disclosure.

Referring to FIG. 11, the embodiment differs from Embodiment 1 in a shape of the piston 64 and sealing ring 621 between the piston 64 and the oil pump base 1.

The protection scope of the present disclosure is not limited to the above embodiments and variations thereof. Common modifications and replacements made by those skilled in the art based on the contents in the embodiments fall within the protection scope of the present disclosure.

What is claimed is:

1. An electric hydraulic floor jack, comprising a frame, an oil pump assembly provided on the frame, a wallboard assembly, a lifting arm assembly provided on the frame and connected to the oil pump assembly, a vehicle wheel provided on the frame, and a variable plunger structure provided on a motor base and an oil pump base; wherein the oil pump assembly comprises the oil pump base, a first housing provided on the oil pump base, a cylinder, a piston rod slidably provided in the cylinder and comprising one end connected to the lifting arm assembly, the motor base provided on the oil pump base, a speed reducer provided on the motor base, a motor connected to the speed reducer, and a power supply configured to provide a power for the motor; an oil chamber is formed between the first housing and the cylinder; an oil inlet passage and an oil return passage are provided on the oil pump base, wherein the oil inlet passage and the oil return passage communicate with the cylinder; an oil drain valve is provided on the oil return passage; a handle is provided on the frame; a switch for starting and stopping the motor and an oil drain valve handle are provided on the handle; an oil drain valve pulling wire is connected between the oil drain valve handle and the oil drain valve; the variable plunger structure comprises a piston hole formed in the oil pump base and communicating with the oil chamber and the oil inlet passage, a plunger sleeve provided at a port of the piston hole, a plunger slidably provided in the plunger sleeve, a U-shaped piston slidably provided in the piston hole, a valve trim slidably provided on the U-shaped piston, a spring provided in the piston hole and sleeved on the valve trim, and an eccentric wheel provided on an output shaft of the speed reducer.

2. The electric hydraulic floor jack according to claim 1, wherein a sealing platform is provided on the valve trim; a bump is provided on the sealing platform; a through hole matched with the bump is formed in the U-shaped piston; and a plurality of oil flow holes are formed in the U-shaped piston.

3. The electric hydraulic floor jack according to claim 2, wherein a length of the bump is greater than a depth of the through hole, and a check valve is provided on the oil inlet passage.

4. The electric hydraulic floor jack according to claim 1, wherein sealing rings are respectively provided between the plunger sleeve and the oil pump base and between the plunger and the plunger sleeve.

5. The electric hydraulic floor jack according to claim 1, wherein the piston rod comprises an ejector rod and a piston head connected to the ejector rod, wherein a sealing member for sealing between the piston head and the cylinder is provided on the piston head.

6. The electric hydraulic floor jack according to claim 1, wherein a filter screen is provided between the spring and a bottom of the piston hole.

7. The electric hydraulic floor jack according to claim 1, wherein the power supply refers to a storage battery or a plug connected to a power socket, and the power supply is connected to the motor through a circuit.

8. The electric hydraulic floor jack according to claim 7, wherein the power supply is also a mobile power supply, and the plug is also connected to the mobile power supply.

9. The electric hydraulic floor jack according to claim 1, wherein the oil drain valve comprises a guide sleeve provided at the oil return passage on the oil pump base, an oil drain valve trim slidably provided on the guide sleeve and connected to the oil drain valve pulling wire, a pulling wire base provided on the oil pump base, and an oil drain spring provided in the oil return passage and located between the oil drain valve trim and the guide sleeve.

10. The electric hydraulic floor jack according to claim 1, wherein an oil suction passage communicating with the oil chamber and the piston hole is formed in the oil pump base, and a first check valve is provided in the oil suction passage.

11. The electric hydraulic floor jack according to claim 1, wherein a first piston hole region between the U-shaped piston and the plunger refers to a pressure oil chamber, and a second piston hole region at the other side of the U-shaped piston refers to an oil suction chamber.

12. The electric hydraulic floor jack according to claim 1, further comprising a radial variable plunger pump, wherein the radial variable plunger pump comprises the motor, the speed reducer connected to the motor, the motor base provided on the speed reducer, a second housing provided on the motor base, and a radial variable mechanism provided in the second housing; the radial variable mechanism further comprises a plunger chamber formed in the second housing, a pump body provided in the plunger chamber, a high-pressure plunger slidably provided in the pump body, a low-pressure plunger slidably provided in the plunger chamber, the valve trim slidably provided on the low-pressure plunger, and the spring provided between a bottom of the plunger chamber and the valve trim; an oil inlet and an oil outlet are formed in the second housing, wherein the oil inlet and the oil outlet communicate with the plunger chamber and are located at two sides of the low-pressure plunger; and each of the oil inlet and the oil outlet is provided with a check valve.

13. The electric hydraulic floor jack according to claim 12, wherein the second housing refers to the oil pump base.

14. The electric hydraulic floor jack according to claim 12, wherein the low-pressure plunger is provided with a through hole; and a drive rod penetrating through the low-pressure plunger is provided on the valve trim.

15. The electric hydraulic floor jack according to claim 14, wherein a length of the drive rod is greater than a depth of the through hole, and a diameter of the drive rod is less than a diameter of the through hole.

16. The electric hydraulic floor jack according to claim 14, wherein an oil groove communicating with the through hole is formed in the low-pressure plunger.

17. The electric hydraulic floor jack according to claim 15, wherein a gap for allowing oil or other liquids to flow through conveniently is formed between the drive rod and the through hole, and the gap communicates with the oil groove.

18. The electric hydraulic floor jack according to claim 12, wherein sealing rings are respectively provided between the pump body and the second housing, between the low-pressure plunger and the second housing, and between the high-pressure plunger and the pump body.

19. The electric hydraulic floor jack according to claim 12, wherein a first plunger chamber region between the low-pressure plunger and the pump body refers to a pressure oil chamber, and a second plunger chamber region at the other side of the low-pressure plunger refers to an oil suction chamber.

20. The electric hydraulic floor jack according to claim 16, wherein a gap for allowing oil or other liquids to flow through conveniently is formed between the drive rod and the through hole, and the gap communicates with the oil groove.

* * * * *